US012781769B2

(12) United States Patent
Richter

(10) Patent No.: US 12,781,769 B2
(45) Date of Patent: Nov. 3, 2026

(54) FEED UNIT FOR A FUEL CELL SYSTEM FOR FEEDING AND/OR CONTROLLING A GASEOUS MEDIUM

(71) Applicant: Robert Bosch GmbH, Stuttgart (DE)

(72) Inventor: Armin Richter, Radolfzell (DE)

(73) Assignee: Robert Bosch GmbH, Suttgart (DE)

( * ) Notice: Subject to any disclaimer, the term of this patent is extended or adjusted under 35 U.S.C. 154(b) by 970 days.

(21) Appl. No.: 18/008,255

(22) PCT Filed: Apr. 28, 2021

(86) PCT No.: PCT/EP2021/061071
§ 371 (c)(1),
(2) Date: Dec. 5, 2022

(87) PCT Pub. No.: WO2021/249690
PCT Pub. Date: Dec. 16, 2021

(65) Prior Publication Data

US 2023/0204050 A1 Jun. 29, 2023

(30) Foreign Application Priority Data

Jun. 10, 2020 (DE) ..................... 10 2020 207 269.8

(51) Int. Cl.
*F04F 5/16* (2006.01)
*B01F 25/60* (2022.01)
(Continued)

(52) U.S. Cl.
CPC ................ *F04F 5/16* (2013.01); *B01F 25/60* (2022.01); *B01F 35/512* (2022.01); (Continued)

(58) Field of Classification Search
CPC ....... F04F 5/16; F04F 5/44; F04F 5/46; B01F 25/60; B01F 35/512; B01F 2101/59; (Continued)

(56) References Cited

U.S. PATENT DOCUMENTS 4,807,814 A * 2/1989 Douche ................. B05B 7/1486 417/174
7,105,243 B2 * 9/2006 Morishima ....... H01M 8/04097 429/444
(Continued)

FOREIGN PATENT DOCUMENTS

AU 2002325650 B2 4/2008
CN 110651125 A 1/2020
(Continued)

OTHER PUBLICATIONS

Translation of International Search Report for Application No. PCT/EP2021/061071 dated Jul. 9, 2021 (2 pages).

*Primary Examiner* — Matthew T Largi
(74) *Attorney, Agent, or Firm* — Michael Best & Friedrich LLP

(57) ABSTRACT

The invention relates to a feed unit (1) for a fuel cell system (31) for feeding and/or controlling a gaseous medium, in particular hydrogen, comprising a jet pump (4), which is driven by a propelling jet of a gaseous medium under pressure, an outlet of the feed unit being fluidically connected to an anode inlet (5) of a fuel cell (32). The jet pump (4) has an intake region (7), a mixing tube (9) and a diffuser region (11), and the gaseous medium flows through the jet pump in a flow direction (III) which runs parallel to a longitudinal axis (52) of the jet pump (4), and the diffuser region (11) is at least indirectly fluidically connected to the anode inlet (5) of a fuel cell (32). The jet pump (4) has a housing assembly (6), the housing assembly (6) having the components main body (8) and mixing tube insert (17), resulting in particular in a modular design of the jet pump (4).

16 Claims, 2 Drawing Sheets

(51) Int. Cl.
*B01F 35/512* (2022.01)
*H01M 8/04082* (2016.01)
*H01M 8/04089* (2016.01)
*B01F 101/59* (2022.01)

(52) U.S. Cl.
CPC ... *H01M 8/04089* (2013.01); *H01M 8/04201* (2013.01); *B01F 2101/59* (2022.01)

(58) Field of Classification Search
CPC ......... H01M 8/04089; H01M 8/04201; H01M 8/04253; H01M 8/04097
See application file for complete search history.

(56) References Cited

U.S. PATENT DOCUMENTS

| | | | | |
|---|---|---|---|---|
| 9,899,697 | B2 * | 2/2018 | Kim | H01M 8/2484 |
| 2005/0002797 | A1 * | 1/2005 | Morishima | F04F 5/461<br>417/182 |
| 2015/0214566 | A1 * | 7/2015 | Jung | H01M 8/0267<br>429/458 |
| 2015/0292524 | A1 * | 10/2015 | Beg | F04F 5/04<br>417/151 |
| 2017/0244119 | A1 * | 8/2017 | Koyama | F04F 5/00 |
| 2019/0386329 | A1 * | 12/2019 | Kanazawa | H01M 8/04358 |

FOREIGN PATENT DOCUMENTS

| | | | | |
|---|---|---|---|---|
| DE | 102018213313 | A1 | 2/2020 | |
| DE | 102018216299 | B3 | 2/2020 | |
| GB | 2207952 | A | 2/1989 | |
| GB | 2384027 | A | 7/2003 | |
| JP | S576000 | U | 1/1982 | |
| JP | S5779152 | U | 5/1982 | |
| JP | 2012255429 | A | 12/2012 | |
| JP | 2022500832 | A | 1/2022 | |
| WO | 8907204 | A1 | 8/1989 | |
| WO | 2013088355 | A1 | 6/2013 | |
| WO | WO-2015116425 | A1 * | 8/2015 | F25B 9/08 |
| WO | 2017169218 | A1 | 10/2017 | |
| WO | 2020071157 | A1 | 4/2020 | |

* cited by examiner

FEED UNIT FOR A FUEL CELL SYSTEM FOR FEEDING AND/OR CONTROLLING A GASEOUS MEDIUM

BACKGROUND OF THE INVENTION

The present invention relates to a feed unit for a fuel cell system for feeding and/or controlling a gaseous medium, in particular hydrogen, which feed unit is provided in particular for use in vehicles with a fuel cell drive system.

In the automotive sector, gaseous fuels will also play an increasing role in future in addition to liquid fuels. In particular, in vehicles with a fuel cell drive system, hydrogen gas flows must be controlled. The gas flows are in this case no longer controlled in discontinuous fashion, as in the case of the injection of liquid fuel, but the gas is extracted from at least one tank, in particular a high-pressure tank, and conducted via an inflow line of a medium-pressure line system to an ejector unit. Said ejector unit conducts the gas via a connecting line of a low-pressure line system to a fuel cell.

DE102018213313 has disclosed a feed unit for a fuel cell system for feeding and/or controlling a gaseous medium, in particular hydrogen. The feed unit in this case has at least one jet pump, which is driven by a motive jet of a pressurized gaseous medium, an outlet of the feed unit being fluidically connected to an anode inlet of a fuel cell. Here, a nozzle is arranged in a main body of the jet pump, the main body of the jet pump having an intake region, a mixing pipe and a diffuser region, and the gaseous medium flowing through said main body in a flow direction which runs parallel to a longitudinal axis of the jet pump.

The feed unit known from DE102018213313 can have certain disadvantages.

Different customer requirements owing to varying fuel cell sizes and fuel cell power ratings can necessitate different sizes of the jet pump with regard to the geometrical form of the internal flow contour, in particular in the region of the mixing pipe, for example mixing pipe radius and/or mixing pipe length, but also in adjacent flow regions of the intake region and/or of the diffuser region. These specific and different customer requirements generate a large number of variants at the individual part level, in particular with regard to the main body of the feed unit, but also at the assembly level, even up to the feed unit as a whole. This gives rise to cost disadvantages owing to high logistical expenditure, manufacturing expenditure, high tooling costs, small batches and variant creation at the start of the value chain.

SUMMARY OF THE INVENTION

The invention relates to a feed unit for a fuel cell system for feeding and/or controlling a gaseous medium, in particular hydrogen, having a jet pump, which is driven by a motive jet of a pressurized gaseous medium, an outlet of the feed unit being fluidically connected to an anode inlet of a fuel cell, the jet pump having an intake region, a mixing pipe and a diffuser region, and the gaseous medium flowing through said jet pump in a flow direction III which runs parallel to a longitudinal axis of the jet pump, and the diffuser region being at least indirectly fluidically connected to the anode inlet of the fuel cell.

The embodiment of the feed unit according to the invention offers the advantage that the jet pump has a housing assembly, the housing assembly having the components main body and mixing pipe insert, the mixing pipe insert being exchangeable, in particular during the course of assembly, such that at least two mixing pipe inserts can be installed in the main body. In this way, the advantage can be achieved that, in the case of different customer requirements with regard to the geometrical form of the internal flow contour of the jet pump, the variance can be implemented by way of the mixing pipe insert, whilst the main body remains identical. Here, during the assembly process, a respective mixing pipe insert that satisfies the respectively stipulated requirements with regard to the flow geometry is installed into the main body. The main body remains identical in terms of its geometrical form, irrespective of the customer requirements. An identical main body of the jet pump can thus be used for different customer requirements and/or geometrical forms of the internal flow contour of the jet pump. In this way, the number of variants at the individual part level, in particular with regard to the main body of the feed unit, but also at the assembly level, even up to the feed unit as a whole, can be reduced. In this way, the advantage can be achieved that logistical expenditure and/or manufacturing expenditure can be reduced, whereby logistical costs and/or manufacturing costs can be reduced. Furthermore, tooling costs can be reduced, because the batch sizes for the main body are increased. Here, the costs for the feed unit as a whole can be reduced, whilst the manufacturing time and/or production time for the respective feed unit can furthermore be reduced.

The subclaims relate to preferred refinements of the invention.

In one advantageous embodiment of the feed unit, the components main body and mixing pipe insert together at least partially form the flow regions intake region, mixing pipe and diffuser region in the interior of the jet pump. In this way, it is at least approximately possible for the part of the inner flow contour of the jet pump to be implemented by way of the main body and the mixing pipe insert, whereby manufacturing costs can be reduced, because it is only in these two components that the geometry of the flow contour must be formed by means of a manufacturing process. The formation of the mixing pipe insert in accordance with the invention offers the advantage that the manufacturing costs for this component can be greatly reduced, because it can be produced using relatively inexpensive methods, for example by turning. In this way, the costs of the feed device as a whole can be reduced.

In one particularly advantageous refinement of the feed unit, the at least two mixing pipe inserts have a different mixing pipe radius and/or a different mixing pipe length, the mixing pipe length running parallel to the longitudinal axis, and the mixing pipe radius running orthogonally with respect to the longitudinal axis. In this way, the advantage can be achieved that the product variance of the feed unit is shifted almost entirely into the mixing pipe insert as a component, whereby the manufacturing costs and/or logistical costs for the production of the feed unit can be reduced. The possibility of installing different mixing pipe inserts with different mixing pipe radii and/or different mixing pipe lengths enables a large number of flow contours to be implemented in the jet pump and in the feed unit, which satisfies the respective customer requirements. The required mixing pipe radius and the required mixing pipe length are influenced by factors such as required volume flow rate, pressure, ideal operating point of the fuel cell, number of jet pumps installed in the fuel system, temperature, and power of the overall vehicle and/or of the fuel cell. Different customer requirements to which the feed unit and/or the jet pump are subject can now be satisfied by virtue of a respective suitable mixing pipe insert being installed during the assembly process, whilst the standard main body of the jet pump can be maintained. The efficiency of the jet pump can thus be improved, whilst the overall costs, in particular the manufacturing costs, for the jet pump and for the feed unit can be reduced.

In one advantageous embodiment of the feed unit, the main body has at least one first shoulder on its inner diameter, and the mixing pipe insert has in each case at least one second shoulder in the region of its outer diameter. In this way, fast and inexpensive assembly is possible by virtue of the respective required mixing pipe insert being pushed into the main body in the direction of the longitudinal axis.

Here, the mixing pipe insert is fixed orthogonally with respect to the longitudinal axis such that said mixing pipe insert is at least indirectly in contact, by way of its outer diameter, with the inner diameter of the main body. In the direction of the longitudinal axis, the mixing pipe insert is fixed in one direction by the second shoulder, which is in contact with the first shoulder of the main body. The mixing pipe insert may furthermore be cooled prior to the assembly process in order to reduce its outer diameter and thus allow easier assembly.

In one particularly advantageous embodiment of the feed unit, the feed unit has a dosing valve in addition to the jet pump, whereby the feed unit is designed as a combined valve-jet pump arrangement. In this way, the advantage can be achieved that, firstly, as short a flow connection as possible can be realized between the dosing valve and the jet pump, because both components are situated spatially directly adjacent to one another in the common main body, and/or the flow connection between the two components has at least approximately no flow diversions. Here, friction losses between the gaseous medium and the flow line can be reduced, whereby the efficiency of the feed device can be improved. Secondly, through the advantageous embodiment of the feed unit as a combined valve-jet pump arrangement in which the dosing valve and the jet pump are arranged in and/or the main body, the surface area of the two components can be reduced, resulting in improved cold-start capabilities of the feed unit. The components dosing valve and jet pump thus cool down more slowly when the vehicle is parked in the presence of low temperatures. Faster heating of the components dosing valve and jet pump configured as a combined valve-jet pump arrangement is also possible. In this way, the likelihood of failure of the feed unit can be reduced, for example owing to reduced ice bridges in the system or in the components, and the service life of the feed unit can be lengthened.

In one particularly advantageous refinement, a heating element is situated between the main body and the mixing pipe insert. In this way, an improved cold start procedure of the jet pump and/or of the feed unit as a whole can be achieved in that, if the vehicle as a whole and/or the fuel cell system are/is at a standstill for long periods of time in the presence of low temperatures below 0° C., at which any water present in the gaseous medium can form ice and/or ice bridges in the region of the internal flow contours. Here, damage to flow-relevant surfaces of the jet pump and/or of downstream and further components of the jet pump can occur as a result of the sharp-edged ice bridges damaging the surfaces. During a cold start procedure, the heating element can be used to melt and thus eliminate the ice bridges before the commencement of operation of the feed unit and the fuel cell system as a whole. In this way, the likelihood of failure of the feed unit can be reduced, for example by way of reduced ice bridges in the system or in the components, and the service life of the feed unit can be lengthened.

According to one advantageous embodiment the feed unit, the main body and the mixing pipe insert are composed of different materials. In this way, the advantage can be achieved that the material of the main body is selected in order to satisfy the requirements with regard to compressive strength or corrosion resistance, whereas the material of the mixing pipe insert is selected such that said material can be processed quickly and inexpensively. In this way, the costs for the jet pump and for the feed unit can be reduced by virtue of the fact that the different requirements to which the main body and the mixing pipe insert are subject can be satisfied in the best possible manner through a selection of different materials. Furthermore, the service life of the jet pump can thus be lengthened, and/or the overall weight of the feed unit can be reduced.

In one advantageous refinement, the mixing pipe insert has a high surface quality and/or low surface roughness in the region of the flow channel. In this way, the advantage can be achieved that the friction losses between the gaseous medium and the internal flow contour of the jet pump and/or of the feed unit can be reduced. The efficiency of the feed unit can thus be improved.

In one particularly advantageous embodiment of the feed unit, the mixing pipe insert is produced at least partially from a material that has a low heat capacity and/or high thermal conductivity. In this way, it is possible in a targeted manner for only the mixing pipe insert to be heated during a cold start process, whilst the main body does not also need to be heated in its entirety. In this way, the heating power can be reduced because the mixing pipe insert can be warmed up more quickly than the main body, whereby the operating costs for the feed unit in particular during a cold start procedure can be reduced.

The invention is not restricted to the exemplary embodiments described here and the aspects highlighted therein. Rather, numerous modifications are possible within the scope specified by the claims, which modifications fall within the abilities of a person skilled in the art.

BRIEF DESCRIPTION OF THE DRAWINGS

The invention will be discussed in more detail below on the basis of the drawing, in which.

DETAILED DESCRIPTION

Figure 1:
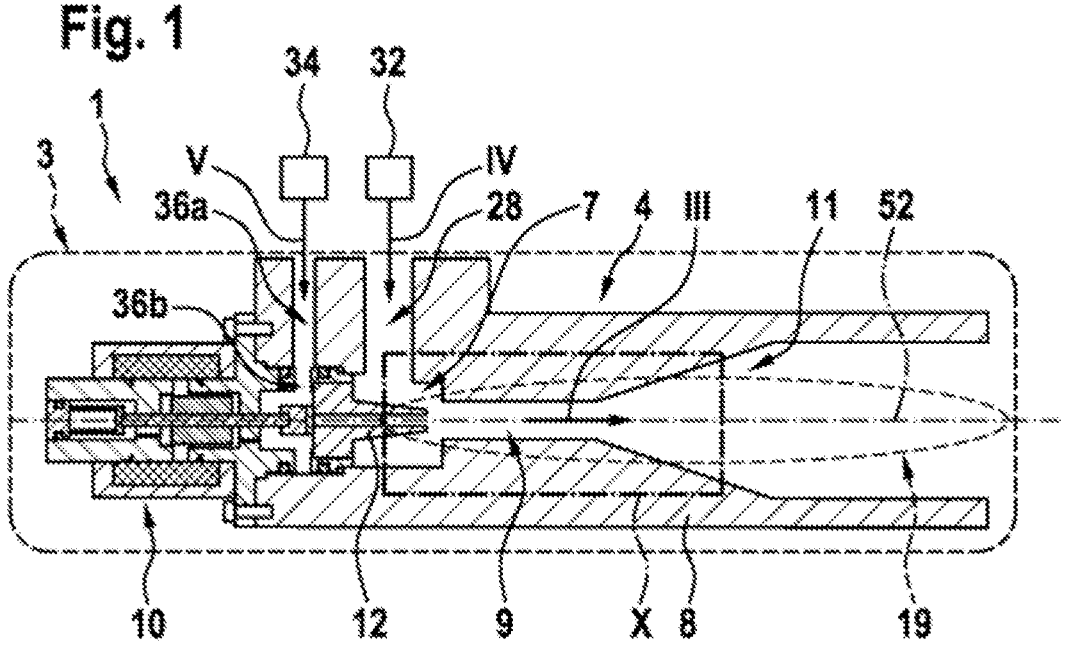
FIG. 1 shows a schematic sectional view of a feed unit with a jet pump and with a dosing valve.

The illustration as per FIG. 1 shows a schematic sectional view of a feed unit 1, the feed unit 1 having a combined valve-jet pump arrangement 3. The combined valve-jet pump arrangement 3 has a dosing valve 10 and a jet pump 4, the dosing valve 10 being connected for example by means of a screw connection to the jet pump 4, in particular to a main body 8 of the jet pump 4.

Here, the jet pump 4 has a first inlet 28, a second inlet 36*a*, an intake region 7, a mixing pipe 9 and a diffuser region 11. The metering valve 10 has the second inlet 36*b* and a nozzle 12. The dosing valve 10 is in particular pushed into the jet pump 4, in particular into an opening in the main body 8 of the jet pump 4, in the direction of a longitudinal axis 52.

FIG. 1 also illustrates that a medium that is to be fed flows in a flow direction III through the combined valve-jet pump arrangement 3. Most of the regions of the valve-jet pump assembly 3 through which flow passes are at least approximately tubular and serve for conveying and/or conducting the gaseous medium, which is in particular $H_2$ with fractions of $H_2O$ and $N_2$, in the feed unit 1. Here, the gaseous medium flows through a central flow region 19 in the interior of the main body 8 parallel to the longitudinal axis 52 in the flow direction III, the central region 19 beginning in the region of the mouth of the nozzle 12 and the intake region 7 and extending through the mixing pipe 9 into the diffuser region 11 and, for example, beyond this, in particular in a region with an at least approximately constant diameter of a flow cross section of the feed unit 1. Here, firstly, a recirculate is supplied to the valve-jet pump arrangement 3 through the first inlet 28, the first recirculate in particular being the unconsumed $H_2$ from an anode region 38 (shown in FIG. 4) of a fuel cell 32, in particular from a stack, wherein the recirculate may also comprise water and nitrogen. Here, the recirculate flows into the valve-jet pump arrangement 3 on a first flow path IV. Secondly, a gaseous motive medium, in particular $H_2$, flows on a second flow path V through the second inlet 36 from outside the valve-jet pump arrangement 3 into an opening of the valve-jet pump arrangement 3 and/or into the main body 8 and/or the dosing valve 10, wherein the motive medium may originate from a tank 34 and is at a high pressure, in particular of higher than 5 bar. Here, the second inlet 36*a, b* runs through the components main body 8 and/or dosing valve 10. From the dosing valve 10, the motive medium is discharged, in particular in discontinuous fashion, through the nozzle 12 into the intake region 7 and/or the mixing pipe 9 by means of an actuator arrangement and a fully closable valve element. The $H_2$ which flows through the nozzle 12 and which serves as motive medium has a pressure difference and/or a speed difference with respect to the recirculation medium that flows into the feed unit 1 from the first inlet 28, wherein the motive medium is in particular at a relatively high pressure of at least 5 bar. When a so-called jet pump effect arises, the recirculation medium is fed at a low pressure into the central flow region 19 of the feed unit 1, for example through the use of a side channel compressor positioned upstream of the feed unit 1. Here, the motive medium flows with the described pressure difference and a high speed, which may in particular lie close to the speed of sound, through the nozzle 12 into the central flow region 19 of the intake region 7 and/or of the mixing pipe 9. Here, the nozzle 12 has an internal recess in the form of a flow cross section through which the gaseous medium can flow, which gaseous medium originates in particular from the dosing valve 10 and flows into the intake region 7 and/or the mixing pipe 9. Here, the motive medium impinges on the recirculation medium that is already situated in the central flow region 19 of the intake region 7 and/or of the mixing pipe 9. Owing to the high speed difference and/or pressure difference between the motive medium and the recirculation medium, internal friction and turbulence is generated between the media. A shear stress arises here in the boundary layer between the fast motive medium and the much slower recirculation medium. This stress causes a transfer of momentum, wherein the recirculation medium accelerates and is entrained. The mixing occurs in accordance with the principle of the conservation of momentum. Here, the recirculation medium is accelerated in the flow direction III, and a pressure drop occurs for the recirculation medium, giving rise to a suction effect and thus a follow-up feed of further recirculation medium from the region of the first inlet 28. This effect can be referred to as the jet pump effect. By controlling the dosed introduction of the motive medium by means of the dosing valve 10, a feed rate of the recirculation medium can be regulated and adapted to the respective requirements of an overall fuel cell system 31 (not shown in FIG. 1) in accordance with an operating state and operating requirements. In an exemplary operating state of the feed unit 1 in which the dosing valve 10 is in a closed state, it is possible to prevent a follow-up flow of the motive medium into the central flow region 19 of the jet pump 4 from the second inlet 36, such that the motive medium can no longer flow into the intake region 7 and/or the mixing pipe 9 in the flow direction III to the recirculation medium, and the jet pump effect is thus eliminated.

After passing through the mixing pipe 9, the mixed medium to be fed, which is composed in particular of the recirculation medium and the motive medium, flows in the flow direction III into the diffuser region 11, wherein a reduction of the flow speed may occur in the diffuser region 11. From there, the medium flows, for example, onward into the anode region 38 of the fuel cell 32.

The feed unit 1 from FIG. 1 furthermore has technical features that additionally improve the jet pump effect and the feed efficiency and/or further improve the cold start operation and/or manufacturing and assembly costs. Here, the diffuser region 11 as a part runs conically, in particular so as to increase in size in the flow direction III, in the region of its internal flow cross section. By means of this form of the diffuser region 11 as a part, the advantageous effect can be generated that the kinetic energy is converted into pressure energy, whereby the possible feed volume of the feed unit 1 can be further increased, whereby more of the medium to be fed, in particular $H_2$, can be supplied to the fuel cell 32, whereby the efficiency of the fuel cell system 31 as a whole can be increased.

According to the invention, the dosing valve 10 may be designed as a proportional valve 10 in order to allow an improved dosing function and more exact dosing of the motive medium into the intake region 7 and/or the mixing pipe 9. In order to further improve the flow geometry and the efficiency of the feed unit 1, the nozzle 12 and the mixing pipe 9 are of rotationally symmetrical design, wherein the nozzle 12 runs coaxially with respect to the mixing pipe 9 of the jet pump 4.

Figure 2:
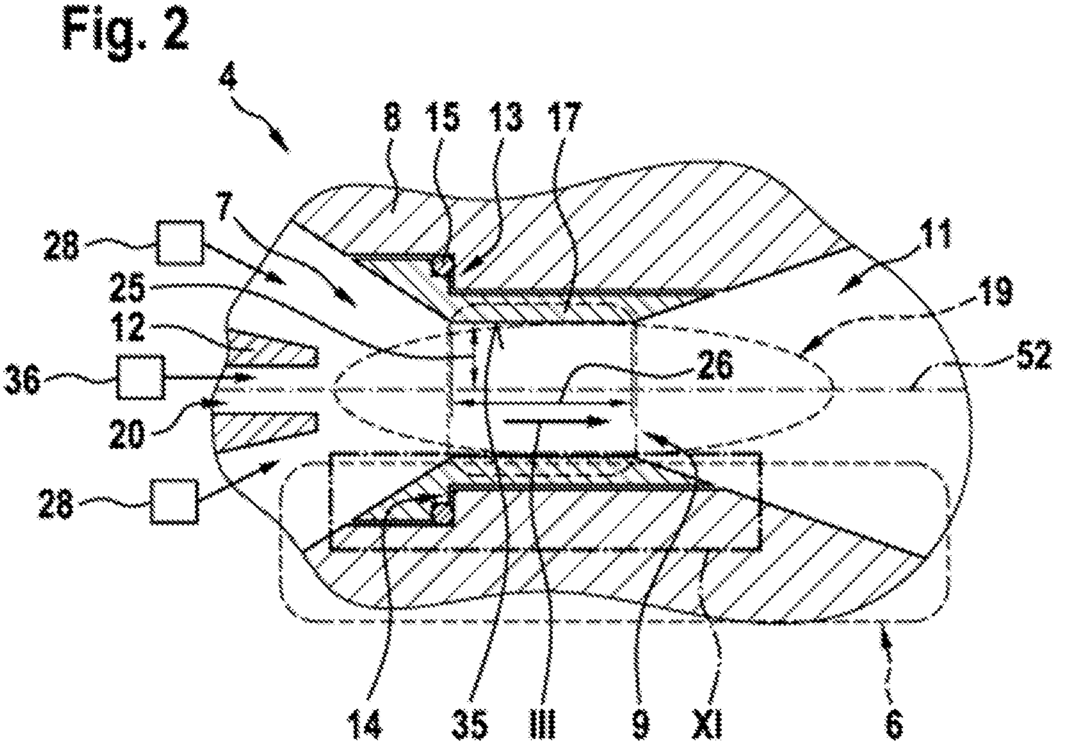
FIG. 2 shows a detail, denoted in FIG. 1 by X, of the jet pump of the feed unit in an enlarged illustration with a housing assembly.

FIG. 2 shows a detail, denoted in FIG. 1 by X, of the jet pump 4 of the feed unit 1 in an enlarged illustration with a housing assembly 6 which has the components main body 8 and mixing pipe insert 17. Here, the jet pump 4 has the nozzle 12 which, in its interior and rotationally symmetrically about the longitudinal axis 52, has an inner flow opening 20 which connects the central flow region 19 and/or the intake region 7 to the second inlet 36 and through which a motive medium can flow. Here, the jet pump 4 has a housing assembly 6, the housing assembly 6 having the components main body 8 and mixing pipe insert 17, the mixing pipe insert 17 being exchangeable, in particular during the course of assembly, such that at least two mixing pipe inserts 17 can be installed in the main body 8. In this way, the feed unit 1 and thus the jet pump 4 can be adapted to different customer requirements and/or specification requirements such that only the mixing pipe insert 17 is exchanged, but the main body 8 can be used for different customer requirements, in particular in accordance with a modular principle. Here, the components main body 8 and mixing pipe insert 17 together at least partially form the flow regions intake region 7, mixing pipe 9 and diffuser region 11 in the interior of the jet pump 4, the mixing pipe insert 17 running at least approximately entirely rotationally symmetrically about the longitudinal axis 52. Furthermore, the at least two mixing pipe inserts 17 have a different mixing pipe radius 25 and/or a different mixing pipe length 26, the mixing pipe length 26 running parallel to the longitudinal axis 52, and the mixing pipe radius 25 running orthogonally with respect to the longitudinal axis 52. Here, the mixing pipe radius 25 is formed between the longitudinal axis 52 and an internal wall 35 of the respective mixing pipe insert 17.

It is also shown in FIG. 2 that the main body 8 has at least one first shoulder 13 on its inner diameter, and the mixing pipe insert 17 has in each case at least one second shoulder 14 in the region of its outer diameter. In this exemplary embodiment, the mixing pipe insert 17 has two first shoulders 13. Here, the at least one first shoulder 13 is in contact with the second shoulder in the direction of the longitudinal axis 52. In this way, during the assembly process, the mixing pipe insert 17 can be pushed into the main body 8 in the direction of the longitudinal axis 52 until said mixing pipe insert is in contact, by way of its first shoulder 13, with the second shoulder 14 of the main body 8, whereby correct alignment of the components main body 8 and mixing pipe insert 17 with respect to one another, in particular in the direction of the longitudinal axis 52, can be ensured, in such a way that the internal flow contour is formed as required. An additional measure that improves the embodiment according to the invention of the jet pump 4 is the arrangement of at least one sealing element 15 between the shoulders 13, 14 of the components of the jet pump 4.

Different requirements, in particular customer requirements, to which the recirculation capability of the jet pump 4 is subject can lead to high variance with regard to the individual optimum internal geometry in the region of the central flow region 19 of the jet pump 4. In many cases, the designs of the optimum geometry differ significantly only in the region of the mixing pipe 9 and/or of the directly adjacent flow regions of intake region 7 and/or diffuser region 11. A modular construction of the feed unit 1 is therefore proposed in which the variance in the region of the flow geometry is shifted into the mixing pipe insert 17 as a component, and the design of the main body 8 of the jet pump 4 remains unchanged. In this way, the number of identical parts can be increased, and costs, in particular variance costs, can thus be reduced. The feed unit 1 thus has, for example, a "platform" housing assembly with a customer-specific mixing pipe insert 17.

FIG. 2 furthermore illustrates that a gaseous recirculation medium, in particular $H_2$, flows into the central flow region 19 from outside the feed unit 1 through the first inlet 28, the gaseous recirculation medium being fed for example from a fuel cell stack. Said gaseous recirculation medium flows through between the nozzle 12 and the main body 8, into the intake region 7 and/or the mixing pipe 9, in the flow direction III.

Figure 3:
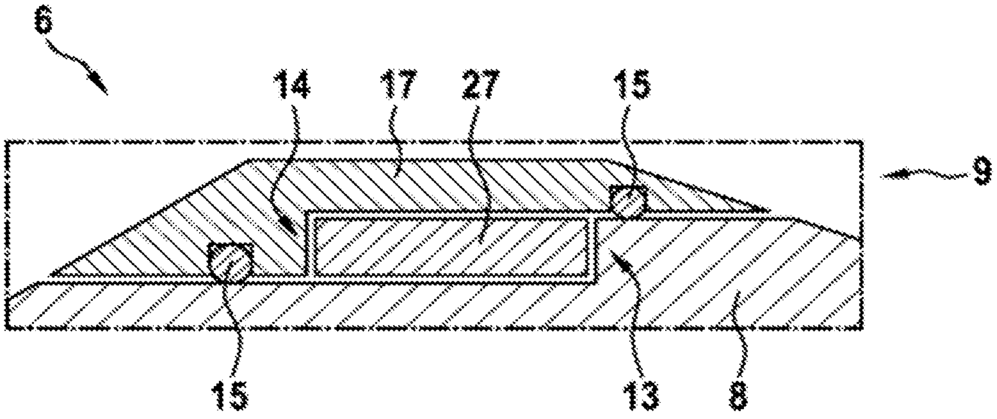
FIG. 3 shows a detail, denoted in FIG. 2 by XI, of the housing assembly with the components main body, mixing pipe insert, heating element and the sealing elements.

FIG. 3 shows a detail, denoted in FIG. 2 by XI, of the housing assembly 6 in the region of the mixing pipe 9 with the components main body 8, mixing pipe insert 17, heating element 27 and at least one sealing element 15. Here, a heating element 27 may be situated between the main body 8 and the mixing pipe insert 17. It is shown here that the main body 8 has the first shoulder 13 and the mixing pipe insert 17 has the second shoulder 14, wherein, in the exemplary embodiment shown, the heating element 27 is situated between the first shoulder 13 and the second shoulder 14 in the direction of the longitudinal axis 52. Here, the heating element 27 may run in at least approximately rotationally symmetrical and/or sleeve-shaped encircling fashion about the longitudinal axis 52. By means of the heating element 27, the risk of ice forming in the feed unit 1, in particular the jet pump 4, for example upon a cold start, can be prevented because the ice can be thawed by virtue of energy being fed to the heating element 27, for example in the form of electrical energy in the case of an electrical heating element 27. Furthermore, upon a cold start, the refreezing of water in the otherwise cold mixing pipe can be prevented. The contacting of the heating element 27 may be implemented for example through a bore in the main body 8. In the exemplary embodiment in FIG. 3, it is shown here that in each case one separate sealing element 15 which runs in encircling fashion around the axis of rotation 52 and which may for example be designed as an O-ring 15 seals off the heating element 27 with respect to the gaseous medium and/or other liquids from the central flow region 19 of the jet pump 4, such that damage to electrical components, for example, can be prevented.

It is furthermore advantageous here if the main body 8 and the mixing pipe insert 17 are composed of different materials. Here, the mixing pipe insert 17 is advantageously produced at least partially from a material that has a low heat capacity and/or high thermal conductivity, in particular in relation to the material of the main body 8. In this way, fast heating of the mixing pipe insert 17 by means of the heating element 27 can be achieved, whilst the main body 8 is heated up only slightly. The energy for unnecessarily heating up the main body 8 can thus be reduced, because it is sought only to thaw the ice bridges in the region of the surface of the mixing pipe insert. It is furthermore advantageous if the mixing pipe insert 17 has a high surface quality and/or a low surface roughness in the region of the flow channel, in particular in relation to the main body 8. The flow contours for which a high surface quality and/or low surface roughness give(s) rise to lower friction losses between the gaseous medium and the feed unit 1 are in this case situated at least approximately exclusively in the region of the mixing pipe insert 17. The production costs for the feed unit 1 can thus be reduced, whilst the efficiency of the feed unit 1 can be increased.

Figure 4:
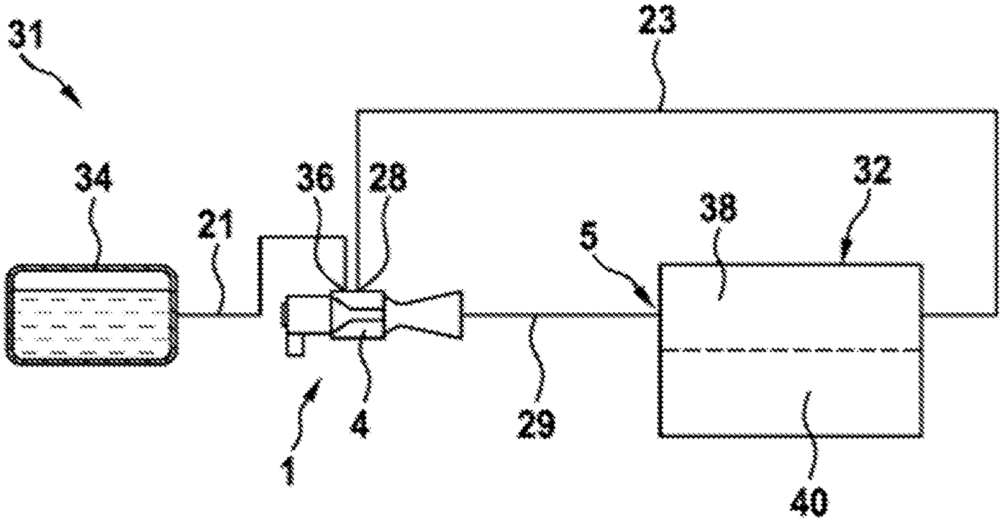
FIG. 4 is a schematic illustration of a fuel cell arrangement according to the invention with a fuel cell and with the feed unit.

FIG. 4 illustrates an exemplary embodiment of the fuel system 31, in particular of an anode circuit. It is shown here that the feed unit 1 is connected via a connecting line 29 to the fuel cell 32, which comprises the anode region 38 and a cathode region 40. Also provided is a recirculation line 23 that connects the anode region 38 of the fuel cell 32 to the first inlet 28, and thus in particular to the intake region 7, of the feed unit 1. Via the recirculation line 23, the first gaseous medium that is not used in the anode region 38 during the operation of the fuel cell 32 can be recirculated to the first inlet 28. Said first gaseous medium is in particular the above-described recirculation medium.

As can also be seen from FIG. 4, the second gaseous medium, which is stored in the tank 34, is supplied via an inflow line 21 to an inflow region, which is configured in particular as the second inlet 36, of the feed unit 1 and/or of the jet pump 4. Said second gaseous medium is in particular the motive medium.

The invention claimed is:

1. A feed unit (1) for a fuel cell system (31) for feeding and/or controlling a gaseous medium, the feed unit (1) having a jet pump (4), which is driven by a motive jet of a pressurized gaseous medium, an outlet of the feed unit (1) being configured to be fluidically connected to an anode inlet (5) of a fuel cell (32), the jet pump (4) having an intake region (7), a mixing pipe (9) and a diffuser region (11), and the gaseous medium flowing through said jet pump in a flow direction which runs parallel to a longitudinal axis (52) of the jet pump (4), and the diffuser region (11) being configured to be at least indirectly fluidically connected to the anode inlet (5) of the fuel cell (32), wherein the jet pump (4) has a housing assembly (6), the housing assembly (6) including a main body (8) and a mixing pipe insert (17), the mixing pipe insert (17) and the main body (8) being configured such that the mixing pipe insert (17) is exchangeable, such that either of at least two different mixing pipe inserts (17) can be installed in the main body (8), wherein the main body (8) and the mixing pipe insert (17) are composed of different materials, and wherein the mixing pipe insert (17) has a lower surface roughness in a region of a flow channel than the main body (8).

2. The feed unit (1) as claimed in claim 1, wherein the main body (8) and the mixing pipe insert (17) together at least partially form flow regions including the intake region (7), the mixing pipe (9) and the diffuser region (11) in an interior of the jet pump (4), the mixing pipe insert (17) running at least approximately entirely rotationally symmetrically about the longitudinal axis (52).

3. The feed unit (1) as claimed in claim 1, wherein the at least two different mixing pipe inserts (17) have a different mixing pipe radius (25) and/or a different mixing pipe length (26), the mixing pipe length (26) running parallel to the longitudinal axis (52), and the mixing pipe radius (25) running orthogonally with respect to the longitudinal axis (52).

4. The feed unit (1) as claimed in claim 1, wherein the main body (8) has at least one first shoulder (13) on an inner diameter of the main body (8), and the mixing pipe insert (17) has in each case at least one second shoulder (14) in a region of an outer diameter of the mixing pipe insert (17).

5. The feed unit (1) as claimed in claim 1, wherein the feed unit (1) has a dosing valve (10) in addition to the jet pump (4), whereby the feed unit (1) is configured as a combined valve-jet pump arrangement (3).

6. The feed unit (1) as claimed in claim 1, wherein the mixing pipe insert (17) is produced at least partially from a material that has a lower heat capacity than the main body (8) and/or higher thermal conductivity than the main body (8).

7. The feed unit (1) as claimed in claim 1, wherein a heating element (27) is situated between the main body (8) and the mixing pipe insert (17).

8. A fuel cell system (31) comprising a fuel cell (32) with an anode inlet (5), and comprising a feed unit (1) having a jet pump (4), which is driven by a motive jet of a pressurized gaseous medium, an outlet of the feed unit (1) being fluidically connected to the anode inlet (5) of the fuel cell (32), the jet pump (4) having an intake region (7), a mixing pipe (9) and a diffuser region (11), and the gaseous medium flowing through said jet pump in a flow direction which runs parallel to a longitudinal axis (52) of the jet pump (4), and the diffuser region (11) being at least indirectly fluidically connected to the anode inlet (5) of the fuel cell (32), wherein the jet pump (4) has a housing assembly (6), the housing assembly (6) including a main body (8) and a mixing pipe insert (17), the mixing pipe insert (17) and the main body (8) being configured such that the mixing pipe insert (17) is exchangeable, during the course of assembly, such that either of at least two different mixing pipe inserts (17) can be installed in the main body (8), wherein the main body (8) and the mixing pipe insert (17) are composed of different materials, and wherein the mixing pipe insert (17) has a lower surface roughness in a region of a flow channel than the main body (8).

9. The fuel cell system (31) as claimed in claim 8, wherein a heating element (27) is situated between the main body (8) and the mixing pipe insert (17).

10. A feed unit (1) for a fuel cell system (31) for feeding and/or controlling a gaseous medium, the feed unit (1) having a jet pump (4), which is driven by a motive jet of a pressurized gaseous medium, an outlet of the feed unit (1) being configured to be fluidically connected to an anode inlet (5) of a fuel cell (32), the jet pump (4) having an intake region (7), a mixing pipe (9) and a diffuser region (11), and the gaseous medium flowing through said jet pump in a flow direction which runs parallel to a longitudinal axis (52) of the jet pump (4), and the diffuser region (11) being configured to be at least indirectly fluidically connected to the anode inlet (5) of a fuel cell (32), wherein the jet pump (4) has a housing assembly (6), the housing assembly (6) including a main body (8) and a mixing pipe insert (17), the mixing pipe insert (17) and the main body (8) being configured such that the mixing pipe insert (17) is exchangeable, during the course of assembly, such that either of at least two different mixing pipe inserts (17) can be installed in the main body (8), wherein the main body (8) and the mixing pipe insert (17) are composed of different materials, and wherein the mixing pipe insert (17) is produced at least partially from a material that has a lower heat capacity than the main body (8) and/or higher thermal conductivity than the main body (8).

11. The feed unit (1) as claimed in claim 10, wherein the main body (8) and the mixing pipe insert (17) together at least partially form flow regions including the intake region (7), the mixing pipe (9) and the diffuser region (11) in an interior of the jet pump (4), the mixing pipe insert (17) running at least approximately entirely rotationally symmetrically about the longitudinal axis (52).

12. The feed unit (1) as claimed in claim 11, wherein the at least two different mixing pipe inserts (17) have a different mixing pipe radius (25) and/or a different mixing pipe length (26), the mixing pipe length (26) running parallel to the longitudinal axis (52), and the mixing pipe radius (25) running orthogonally with respect to the longitudinal axis (52).

13. The feed unit (1) as claimed in claim 12, wherein the main body (8) has at least one first shoulder (13) on an inner diameter of the main body (8), and the mixing pipe insert (17) has in each case at least one second shoulder (14) in a region of an outer diameter of the mixing pipe insert (17).

14. The feed unit (1) as claimed in claim 13, wherein the feed unit (1) has a dosing valve (10) in addition to the jet pump (4), whereby the feed unit (1) is configured as a combined valve-jet pump arrangement (3).

15. The feed unit (1) as claimed in claim 10, wherein a heating element (27) is situated between the main body (8) and the mixing pipe insert (17).

16. The feed unit (1) as claimed in claim 10, wherein the gaseous medium includes hydrogen.

* * * * *